April 23, 1935. T. O. STRAUSS 1,998,855
INTERMITTENT DRIVING MECHANISM
Filed May 5, 1934
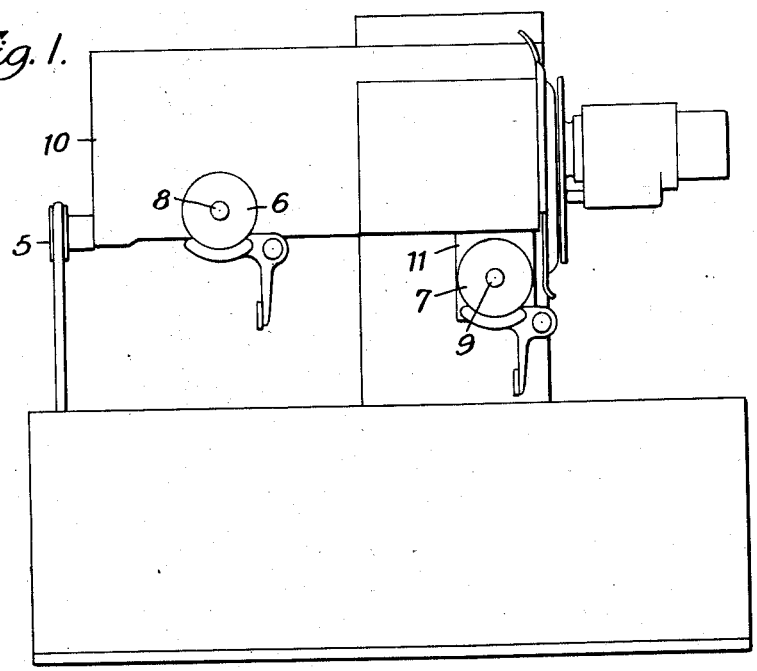
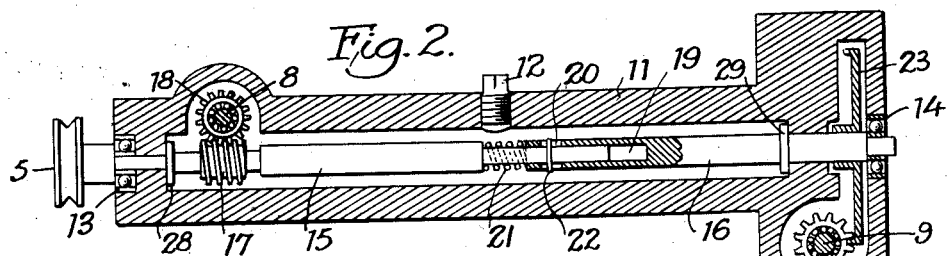
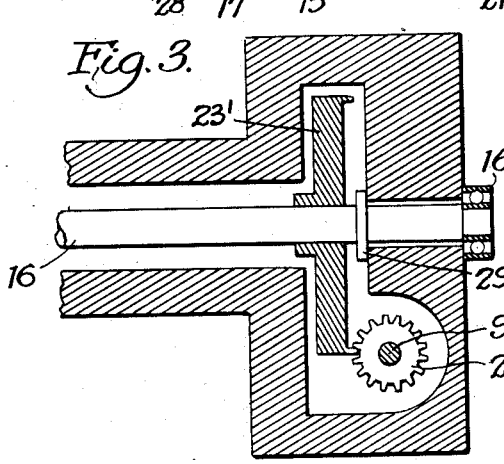
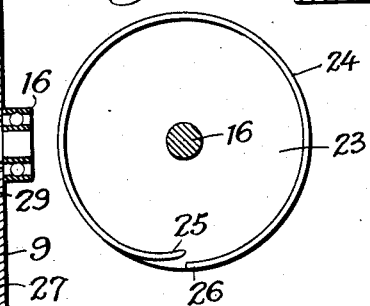
Inventor
Theodore O. Strauss,
By James P. Duhamel,
Attorney Patented Apr. 23, 1935

1,998,855

UNITED STATES PATENT OFFICE 1,998,855

INTERMITTENT DRIVING MECHANISM

Theodore O. Strauss, New York, N. Y., assignor to Casteel Research Laboratories, Inc., New York, N. Y., a corporation of New York Application May 5, 1934, Serial No. 724,177

2 Claims. (Cl. 74—436)

This invention relates to intermittent drive mechanisms for use where continuous operation may be converted into step-by-step movement and the object of the invention is to produce a cam operation where the wear is reduced to a minimum and automatic adjustment takes place to provide for what wear results from continual use.

These and other objects of the invention are more fully described in the following specification, set forth in the appended claims and illustrated in the accompanying drawing wherein:

Figure 1 is an elevational view of a motion picture projector with the invention applied thereto.

Fig. 2 is a sectional view through the shaft housing.

Fig. 3 is a sectional view of a modified form of the cam gearing.

Fig. 4 is a face view of the cam.

While the improved device may be used in many varieties of light machinery it is shown in the drawing as adapted to provide for the intermittent movement of a film in a moving picture projector and in which case the pulley 5 is shown that is carried by the shaft that affords movement for the sprocket roller 6 and the intermittent roller 7. These two rollers are carried on shafts 8 and 9 respectively.

Within the box 10 of the projector is located a cast metal housing 11 with journal bearings at each end and a tap 12 for the introduction of a lubricant.

Journalled in the bearings 13 and 14 is a shaft that is divided into two sections 15 and 16, the former having the pulley 5 at its outer end and a worm 17 that drives the gear wheel 18 on the shaft 8 and which gives continuous rotation to the pulley 6. The inner end of section 15 is reduced to fit into a socket 19 at the inner end of section 16, the hollowed shaft section being slotted at 20 to receive a cross pin 22 carried by the reduced end of the section 15. Interposed between the two shaft sections is a spring 21 to force the sections against their journals, but they are insured unity of rotation by the pin 22.

Near the outer end of section 16 is a cam consisting of the circular disc 23 with a flange 24 around its edge. At one point around the flange it is broken and one edge is turned inward towards the centre of the disc as at 25 so that when the flange at 26 leaves the interval between two of the teeth of the pinion 27 on shaft 9 the end 25 of the flange will enter the next interval and the concentric portion of the flange will advance the pinion 27 one tooth.

While the cam is shown outside of the gear wheel in Fig. 2, it will be seen in Fig. 3 that the facing of the cam 23' may be reversed to place the cam on the right of the gear wheel but the cams in each instance are identical and as shown in Fig. 4 or may be reversed.

While the roller 6 is rotating continually the rotation of the roller 7 is only one tenth as fast.

When in use the interior of the housing 11 may be filled with a lubricant and flanges 28 and 29 on the shaft sections and adjacent to the bearings will tend to prevent leakage and prevent undue friction of the parts.

It is obvious that the parts may be otherwise arranged or modified without departing from the essential features above described or from the scope of the appended claims.

What I claim as new is:

1. In intermittent driving mechanism, the combination of a lubricant containing housing having an inlet, bearings at each end of the housing, a shaft section having a pulley at its outer end, a driving screw at said pulley end of said shaft section, a second shaft section having a cam at its outer end, a gear wheel operated intermittently by said cam, a reduced end to the first mentioned shaft section and loosely fitting into a socket in the inner end of the second shaft section, a pin causing the two sections to rotate together, and a spring encircling the reduced end of the first shaft section and bearing against the adjacent end of the second section.

2. In intermittent driving mechanism, the combination of a lubricant containing housing having a separate chamber at one end and an inlet for a lubricant, bearings at each end of the housing, a shaft section journalled in one of the bearings and having a sealing flange thereat, a second shaft section having a similar flange at its bearing, a reduced end on the first shaft section and adapted to fit into a socket in the adjacent end of the second section, a pin passing through the two sections to cause them to rotate together but permitting them to separate longitudinally, a spring around the reduced end of the first section and exerting a pressure between the two sections, a cam consisting of a disc and interrupted flange in the end chamber and at the end of the second named shaft section, and driving means at the outer end of the first mentioned shaft section.

THEODORE O. STRAUSS.